United States Patent Office.

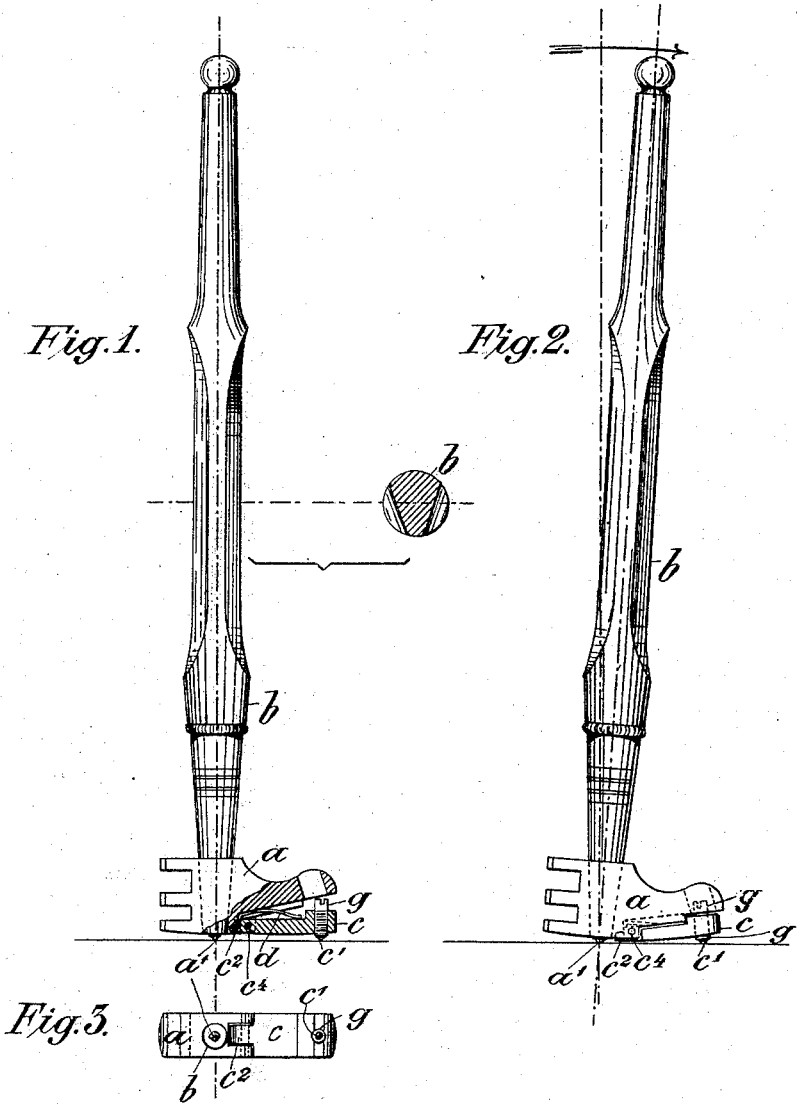

JOHANN URBANEK, OF FRANKFORT-ON-THE-MAIN, GERMANY.

IMPLEMENT FOR CUTTING GLASS.

SPECIFICATION forming part of Letters Patent No. 482,601, dated September 13, 1892.

Application filed April 26, 1892. Serial No. 430,937. (No model.)

*To all whom it may concern:*

Be it known that I, JOHANN URBANEK, a subject of the Emperor of Austria, and a resident of Frankfort-on-the-Main, Germany, have invented certain new and useful Improvements in Implements for Cutting Glass, of which the following is a specification.

The ordinary implement for cutting glass, known under the name of "glazier's diamond," consists of a handle provided with a block in which a diamond is fixed. Such implement requires considerable practice for proper use, especially in cutting glasses of different thicknesses.

According to the present invention the implement is provided not only with the ordinary sharp cutting-diamond, but also with an elastic hinged guide-piece holding a blunt diamond. By this means the implement is guided better and it is possible to cut the glass not only with the point, but also with the edge of the sharp diamond.

With reference to the accompanying drawings, Figure 1 is a view, partly in section, of the implement in vertical position; and Fig. 2 is a view of the same in an inclined position. Fig. 3 is a bottom plan view.

$a$ is the block, rigidly fixed to the handle $b$, and $c$ is a block hinged to the block $a$ at $c^4$ and serving as guide-piece. The sharp diamond $a'$ is fixed in the projecting end of the handle $b$. The hinged block $c$ is provided with an adjustable screw $g$, in which a blunt diamond $c'$ is fixed. The spring $d$ makes this hinged block elastic by pressing its end $c'$ downward and its other end $c^2$ upward until the person holding the implement forces the hinged block down, as shown in Fig. 2, against the pressure of the spring $d$.

The advantages of this improved implement are as follows:

First. The same implement can be used to the same advantage for thick or thin glass.

Second. The person using the implement may have a heavy or a light hand, and yet be able to cut the glass well.

Third. The sharp diamond is more durable, because not only its point, but also its edge, is brought into use.

Fourth. The implement may be readily used after little practice for cutting large panes of glass of different thicknesses, the only difference in use being that greater pressure is required to be applied to the implement when cutting thicker glass.

I claim—

1. In implements for cutting glass, the block $a$ and elastically-hinged block $c$, holding the blunt diamond $c'$, in combination with the handle $b$, rigidly fixed to the block $a$ and holding the sharp diamond $a'$.

2. The handle $b$ and block $a$, rigidly fixed to each other, in combination with the block $c$, hinged at $c^4$ and provided with the spring $d$.

3. The handle $b$, with block $a$ rigidly fixed to the handle and holding the sharp diamond $a'$, in combination with the block $c$, hinge $c^4$, spring $d$, and adjustable screw $g$, holding the blunt diamond $c$.

In testimony whereof I have affixed my signature in presence of two witnesses.

JOHANN URBANEK.

Witnesses:
 JEAN GRUND,
 FRANK H. MASON.